Patented Jan. 10, 1939

2,143,389

UNITED STATES PATENT OFFICE 2,143,389

DYES OF THE CYANINE SERIES

Wilhelm Schneider, Dessau, Germany, assignor to Agfa Ansco Corporation, Binghamton, N. Y., a corporation of New York No Drawing. Application June 24, 1936, Serial No. 87,037. In Germany January 26, 1933

4 Claims. (Cl. 260—240)

My present invention relates to a new class of dyes of the cyanine series and more particularly to naphthoxazole trimethinecyanines. It is a continuation in part of my application Ser. No. 702,260 filed Dec. 13, 1933.

One of its objects is to provide a new class of sensitizing dyes for photographic emulsions. Another object are the naphthoxazole trimethinecyanines substituted by alkyl, aryl or aralkyl at the central carbon atom of the trimethenyl chain. Further objects will be seen from the detailed specification following hereafter.

According to this invention I have found that the base 2-methyl-naphtho-2'.1':4.5-oxazole corresponding with the following formula

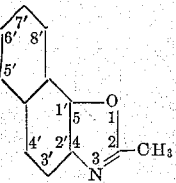

or the base 2-methyl-naphtho-1'.2':4.5-oxazole corresponding with the following formula

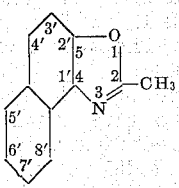

yield trimethinecyanines substituted at the central carbon atom of the trimethenyl chain when converting according to known methods these bases into a quaternary ammonium salt and condensing the quaternary ammonium salt with a suitably substituted trialkyl-ortho-ester in the presence of an organic base. Thus, in the case of triethyl-ortho-propionate the central carbon atom is substituted by ethyl. In the case of ortho-esters of aromatic carboxylic acids an aromatic radical will be introduced at the central carbon atom of the trimethenyl chain. If the phenyl group is linked to the carbon atom of the carboxylic group phenyl will be introduced at the central carbon atom of the trimethenyl chain. If the phenyl group is substituted by an alkyl group, an aralkyl group is introduced at the central carbon atom. The dyes may also be produced according to the co-pending application Ser. No. 651,811 filed Jan. 14, 1933, by Koslowsky. The dyes substituted at the central carbon atom by a thienyl group may be obtained analogously to the methods described in the co-pending application Ser. No. 661,185 filed by Schneider.

For sensitizing photographic silver halide emulsions, the dyes may be used in a quantity such as is usual in the case of the known sensitizing dyes. This quantity may amount to about 10 to 50 milligrams per kilo of emulsion ready for being cast and containing about 9 per cent of gelatin, 4.5 per cent of silver halide and the rest water. However, the invention is not limited to these quantities and the most suitable amount can be found in each case by a few comparative experiments.

The dyes may be added to the emulsion in the form of solutions; suitable solvents are the alcohols, for instance methyl or ethyl alcohol, which may be used anhydrous or diluted with water. They may be incorporated in the emulsion during any stage of its production; preferably, however, they are added to the finished emulsion before casting.

The dyes may also be incorporated in the emulsion by bathing the finished photographic material in a bath in which the dye is dissolved. Such a treatment may be as follows: The photographic material to be sensitized is bathed in a solution containing 1 milligram of the dye in about 50 cc. of an aqueous solution of methanol of 50 per cent strength. The material is then dried, whereupon it is ready for use.

The following examples serve to illustrate my invention:

*Example 1.*—The dye bis-[3-methyl-naphtho-1'.2':4.5-oxazole-(2)] - β - ethyl-trimethine-cyanine bromide corresponding with the formula

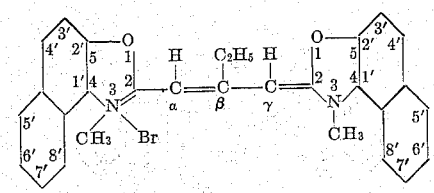

may be obtained by heating 3 grams of 2-methyl-β-naphthoxazole dimethylsulfate, 3 cc. of triethyl orthopropionate and 10 cc. of pyridine to 125–130° C. for 1 to 2 hours. The dye is precipitated from the reaction mixture by means of ether, it is filtered off, and dissolved in alcohol. To the alcoholic solution there is added a solution of potassium bromide, the dye precipitated by means of ether and recrystallized from alcohol.

The alcoholic solution of the dye has an absorption maximum at a wave length of about 520μμ.

A silver bromide emulsion containing about 4 to 5 per cent of silver iodide is sensitized for waves from about 500 to 600μμ with a maximum at about 565μμ by incorporation of the dye.

*Example 2.*—The dye bis-[3-methyl-naphtho-2'.1':4.5-oxazole-(2)]-β-methyl-trimethine-cyanine bromide corresponding with the formula

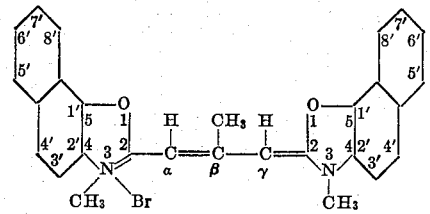

may be prepared by heating 3 grams of 2-methyl-α-naphthoxazole dimethylsulfate, 3 cc. of triethyl orthoacetate and 10 cc. of pyridine to 130° C. for about 1 hour. The further working up is as described in Example 1.

The alcoholic solution of the dye has an absorption maximum at a wave length of about 520 μμ.

A silver bromide emulsion containing about 4 to 5 per cent of silver iodide is sensitized to waves from about 500 to 600 μμ with a maximum at about 550μμ by incorporation of the dye.

*Example 3.*—The dye bis-[3-methyl-naphtho-2'.1':4.5-oxazole-(2)]-β-ethyl-trimethine-cyanine bromide corresponding with the formula

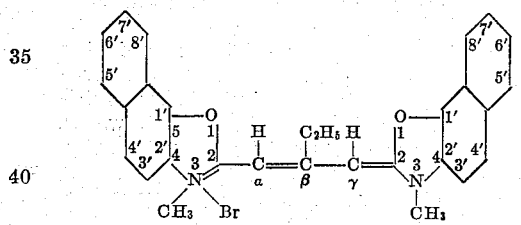

may be prepared by heating 3 grams of 2-methyl-α-naphthoxazole dimethylsulfate, 3 cc. of triethyl orthopropionate and 10 cc. of pyridine to 130° C. for about 1 hour. The further working up is as described in Example 1.

The alcoholic solution of the dye has an absorption maximum at a wave length of about 518μμ.

A silver bromide emulsion containing about 4 to 5 per cent of silver iodide is sensitized to waves from 500 to 600μμ with a maximum at about 565μμ by incorporation of the dye.

*Example 4.*—The dye bis-[3-methyl-naphtho-2'.1':4.5-oxazole-(2)]-β-thienyl-trimethine-cyanine bromide corresponding with the formula

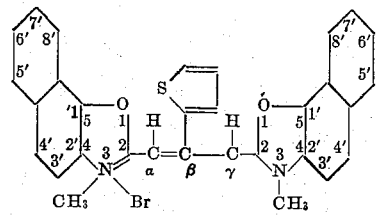

may be prepared by heating 3 grams of 2-methyl-α-naphthoxazole dimethylsulfate, 4 cc. of triethyl-orthothiophenate and 10 cc. of pyridine to 135° C. for 1 hour. The further working up is as described in Example 1.

The alcoholic solution of the dye has an absorption maximum at a wave length of about 535μμ.

A silver bromide emulsion containing about 4 to 5 per cent of silver iodide is sensitized to waves from about 515μμ to 620μμ with a maximum at about 590μμ by incorporation of the dye.

*Example 5.*—The dye bis-[3-methyl-naphtho-1'.2':4.5-oxazole-(2)]-β-ethyl-trimethine-cyanine bromide corresponding with the formula

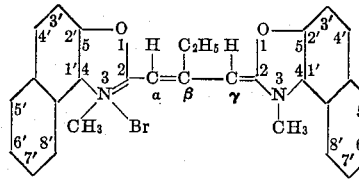

may be prepared by heating 10 grams of 2-methyl-β-naphthoxazole dimethylsulfate, 7 cc. of ethylisothiopropionic acid anilide and 15 cc. of pyridine in an open vessel to 140° C. for about 1 hour. The dye is precipitated in form of the bromide and filtered off after cooling.

The alcoholic solution of the dye has an absorption maximum at a wave length of about 520μμ.

A silver bromide emulsion containing about 4 to 5 per cent of silver iodide is sensitized to waves from about 500 to 600μμ with a maximum at about 565μμ by incorporation of the dye.

*Example 6.*—The dye bis-[3-methyl-naphtho-2'.1':4.5-oxazole-(2)]-β-phenyl-trimethine-cyanine bromide corresponding with the formula

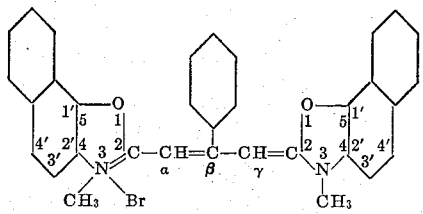

may be prepared by heating 3 grams of 2-methyl-α-naphthoxazole dimethylsulfate, 4 cc. of triethyl orthobenzoate and 10 cc. of pyridine at 135° C. for about 1 hour. The further working up is as described in Example 1.

The alcoholic solution of the dye has an absorption maximum at a wave length of about 525μμ.

A silver bromide emulsion containing about 4 to 5 per cent of silver iodide is sensitized by the dye to light of wave lengths from about 500 to 610μμ with a maximum at about 570μμ.

What I claim is:

1. A bis-[3-methyl-naphtho-1'.2':4.5-oxazole-(2)]-β-ethyl-trimethinecyanine bromide.

2. A bis-[3-methyl-naphtho-2'.1':4.5-oxazole-(2)]-β-methyl-trimethinecyanine bromide.

3. A bis-[3-methyl-naphtho-2'.1':4.5-oxazole-(2)]-β-ethyl-trimethinecyanine bromide.

4. Bis-[3-alkyl-α.β-naphtho-oxazole-(2)]-trimethinecyanine salts substituted at the central carbon atom of the trimethine chain by a radical selected from the group consisting of methyl, ethyl, phenyl and thienyl.

WILHELM SCHNEIDER.